United States Patent
Wakana

(10) Patent No.: US 9,235,786 B2
(45) Date of Patent: Jan. 12, 2016

(54) PRINTING APPARATUS AND METHOD OF CONTROLLING THE SAME AND STORAGE MEDIUM

(71) Applicant: CANON KABUSHIKI KAISHA, Tokyo (JP)

(72) Inventor: Toru Wakana, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/045,406

(22) Filed: Oct. 3, 2013

(65) Prior Publication Data

US 2014/0111819 A1 Apr. 24, 2014

(30) Foreign Application Priority Data

Oct. 24, 2012 (JP) .................................. 2012-234959

(51) Int. Cl.
*G06F 3/12* (2006.01)
*G06K 15/16* (2006.01)

(52) U.S. Cl.
CPC ...................................... *G06K 15/16* (2013.01)

(58) Field of Classification Search
CPC .. G06F 3/1253; G06F 3/1255; B41J 13/0018; G03G 15/6508; G06K 15/16; G06K 15/4065; G06K 15/1823

USPC ......................................................... 358/1.15
See application file for complete search history.

(56) References Cited

U.S. PATENT DOCUMENTS

| 2010/0020342 | A1* | 1/2010 | Shibata | ........................... 358/1.9 |
| 2011/0242584 | A1* | 10/2011 | Igarashi | ....................... 358/1.15 |
| 2012/0194857 | A1* | 8/2012 | Yamada | ....................... 358/1.15 |

FOREIGN PATENT DOCUMENTS

JP 4143949 A 9/2008

* cited by examiner

*Primary Examiner* — Marivelisse Santiago-Cordero
*Assistant Examiner* — Kent Yip
(74) *Attorney, Agent, or Firm* — Carter, DeLuca, Farrell & Schmidt, LLP

(57) ABSTRACT

Provided is a printing apparatus having a plurality of sheet feeding units, and method of controlling the printing apparatus. When a print job including paper feed source information is received, paper information set for the sheet feeding unit designated by the paper feed source information is obtained, and stored together with data of this print job. Also, when execution of the stored print job is instructed, a sheet feeding unit that accommodates a sheet having the paper information is selected, and control is performed such that a sheet is fed from the selected sheet feeding unit, and the stored print job is executed on the fed sheet.

7 Claims, 13 Drawing Sheets

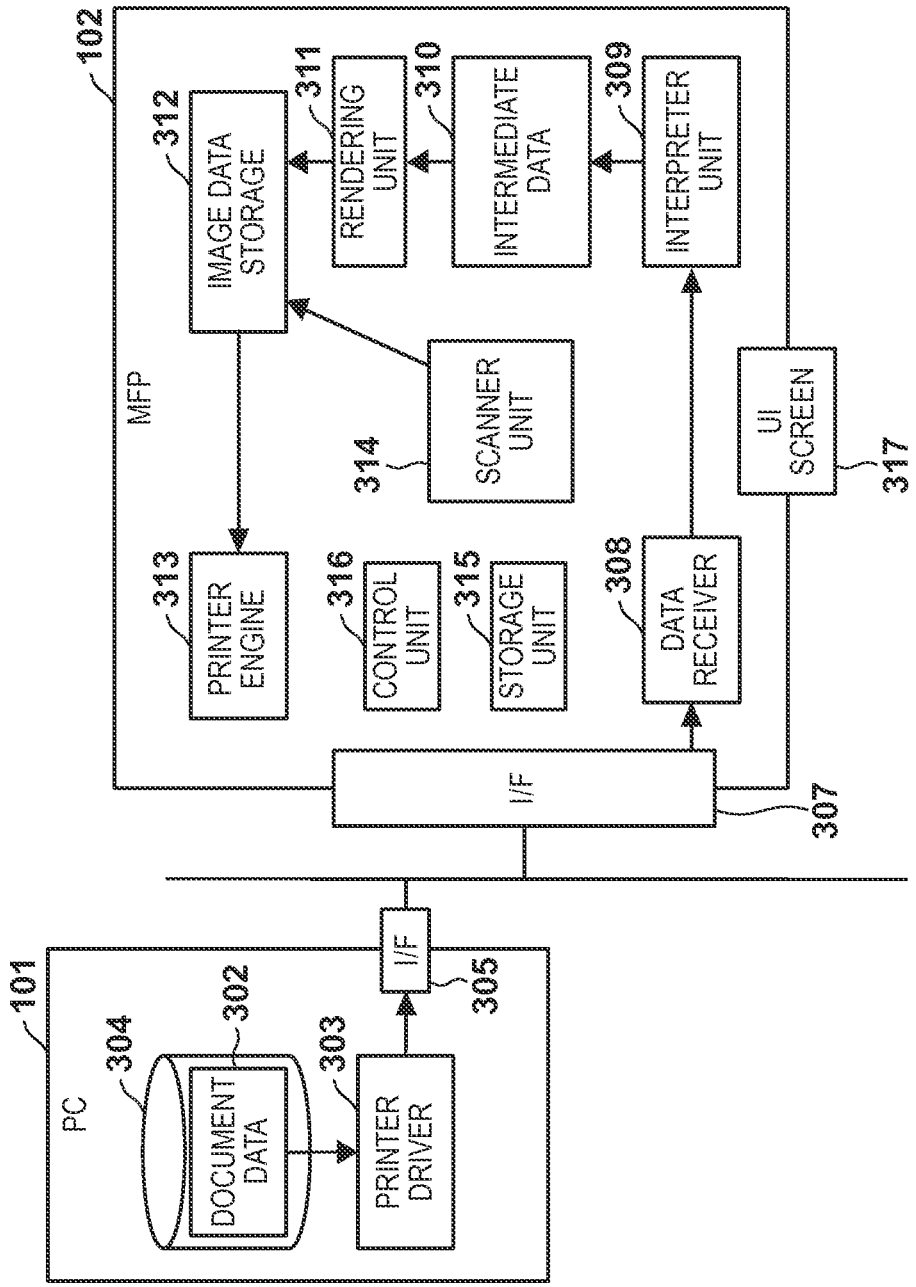

F I G. 5

| 202 | PAPER FEED DECK 1 | PLAIN PAPER | A3 |
| --- | --- | --- | --- |
| 203 | PAPER FEED DECK 2 | PLAIN PAPER | A4 |
| 204 | PAPER FEED DECK 3 | PLAIN PAPER | A3 |
| 205 | PAPER FEED DECK 4 | PLAIN PAPER | A4 |
| 212 | PAPER FEED DECK 5 | THICK PAPER | A3 |
| 213 | PAPER FEED DECK 6 | THICK PAPER | A4 |
| 214 | PAPER FEED DECK 7 | THICK PAPER | A3 |
| 215 | PAPER FEED DECK 8 | THICK PAPER | A4 |
| 216 | PAPER FEED DECK 9 | THICK PAPER | A3 |
| 217 | PAPER FEED DECK 10 | THICK PAPER | A4 |

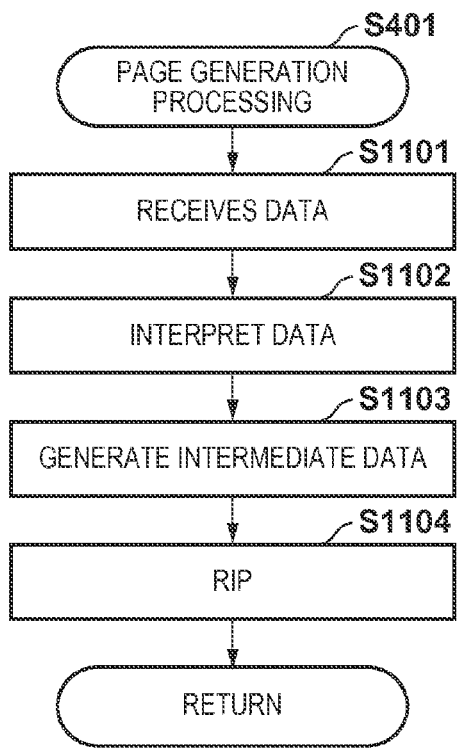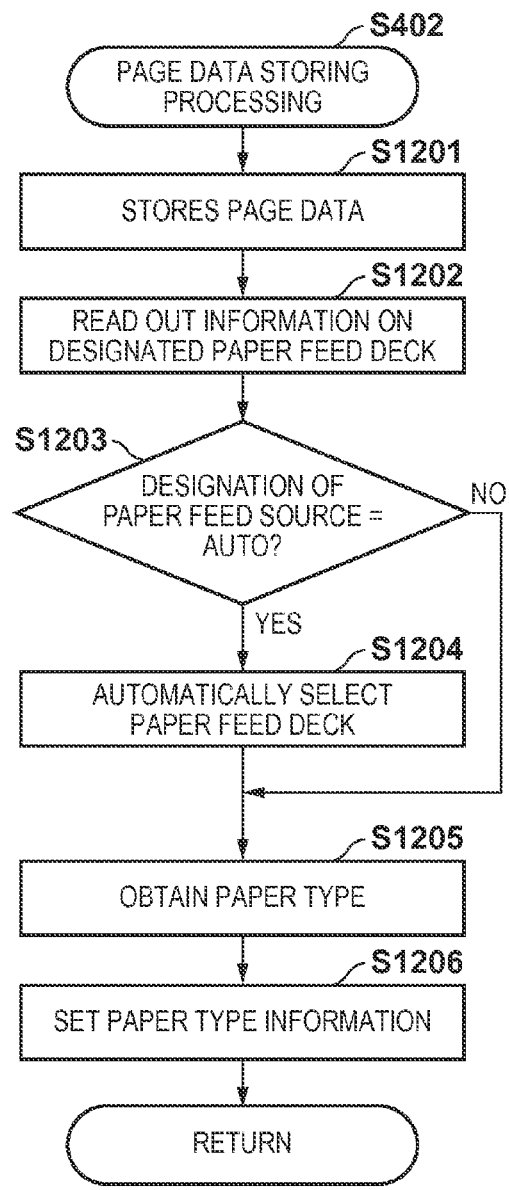

FIG. 14A

| STORAGE DESTINATION NUMBER = 0 |
| --- |
| A4 |
| PAPER FEED DECK 2 |
| NOT-SPECIFIED ~1401 |
| NOT-SPECIFIED ~1402 |

FIG. 14B

| STORAGE DESTINATION NUMBER = 0 |
| --- |
| A4 |
| PAPER FEED DECK 2 |
| PLAIN PAPER ~1401 |
| NOT-SPECIFIED ~1402 |

FIG. 14C

| STORAGE DESTINATION NUMBER = 0 |
| --- |
| A4 |
| AUTO |
| Any ~1401 |
| NOT-SPECIFIED ~1402 |

FIG. 14D

| STORAGE DESTINATION NUMBER = 0 |
| --- |
| A4 |
| PAPER FEED DECK 2 |
| PLAIN PAPER ~1401 |
| PLACE PRIORITY ON PAPER FEED SOURCE ~1402 |

FIG. 14E

| STORAGE DESTINATION NUMBER = 0 |
| --- |
| A4 |
| PAPER FEED DECK 2 |
| PLAIN PAPER ~1401 |
| PLACE PRIORITY ON PAPER TYPE ~1402 |

| | | | |
|---|---|---|---|
| 202 | PAPER FEED DECK 1 | THICK PAPER | A3 |
| 203 | PAPER FEED DECK 2 | THICK PAPER | A4 |
| 204 | PAPER FEED DECK 3 | THICK PAPER | A3 |
| 205 | PAPER FEED DECK 4 | THICK PAPER | A4 |
| 212 | PAPER FEED DECK 5 | PLAIN PAPER | A3 |
| 213 | PAPER FEED DECK 6 | PLAIN PAPER | A4 |
| 214 | PAPER FEED DECK 7 | PLAIN PAPER | A3 |
| 215 | PAPER FEED DECK 8 | PLAIN PAPER | A4 |
| 216 | PAPER FEED DECK 9 | PLAIN PAPER | A3 |
| 217 | PAPER FEED DECK 10 | PLAIN PAPER | A4 |

PRINTING APPARATUS AND METHOD OF CONTROLLING THE SAME AND STORAGE MEDIUM

BACKGROUND OF THE INVENTION

1. Field of the Invention

The present invention relates to a printing apparatus that designates at least one sheet feeding unit among a plurality of sheet feeding units, and performs printing on a sheet that is fed from the sheet feeding unit, and a method for controlling the same, and a storage medium.

2. Description of the Related Art

There are copiers and printers that can temporarily store image data in a storage area (such as a hard disk or a memory) and, by reading out the image data from this storage area, repeatedly print the same data (see, for example, Japanese Patent No. 414949). Note that the image data in this context includes image data obtained by a scanner and image data obtained from print data received from a host computer. Specifically, in recent days, there are copiers and printers that can store not only image data but also print data that was received from a host computer and not converted into image data, and can perform printing based on the stored print data at an arbitrary timing.

However, print settings of an image forming apparatus, such as a copier, a printer, or the like, when image data is printed may be changed from those when the image data was stored in the image forming apparatus, and in such a case an unexpected printed material may be obtained. For example, when a specific sheet feeding unit was designated as a paper feed source for feeding a sheet on which the image data is to be printed, paper that is set in the specific sheet feeding unit may be changed between when the image data was stored and when the image data is printed. Therefore, when printing the image data, it is likely that an unexpected sheet (plain paper, thick paper, and the like) is fed and a printed material using the unexpected sheet is obtained.

SUMMARY OF THE INVENTION

An aspect of the present invention is to eliminate the above-mentioned problems with the conventional technology.

A feature of the present invention is to provide a technique that enables printing using a sheet that is originally intended by a print job even when settings of a sheet feeding unit when the print job was stored are different from those when the stored print job is printed.

According to an aspect of the present invention, there is provided a printing apparatus comprising a plurality of sheet feeding units; a setting unit configured to set paper information for each of the plurality of sheet feeding units; a reception unit configured to receive a print job including paper feed source information; a storage unit configured to obtain paper information set for the sheet feeding unit designated by the paper feed source information, and store the paper information together with data of the print job; a selection unit configured to select, in a case that execution of the print job is instructed, a sheet feeding unit that accommodates a sheet having the paper information stored in the storage unit; and a control unit configured to perform control such that a sheet is fed from the sheet feeding unit selected by the selection unit and the print job stored in the storage unit is executed to print an image on the fed sheet.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3A is a functional block diagram illustrating a functional configuration of the printing system according to the embodiment.

FIG. 5 is a diagram illustrating paper information that is set for paper feed decks 1 to 10 of the MFP according to the embodiment.

FIG. 11 is a flowchart for describing page generation processing in step S401 of FIG. 4.

FIG. 12 is a flowchart for describing page data storage processing in step S402 of FIG. 4 performed by the MFP.

FIGS. 14A to 14E are diagrams illustrating paper feed source information.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
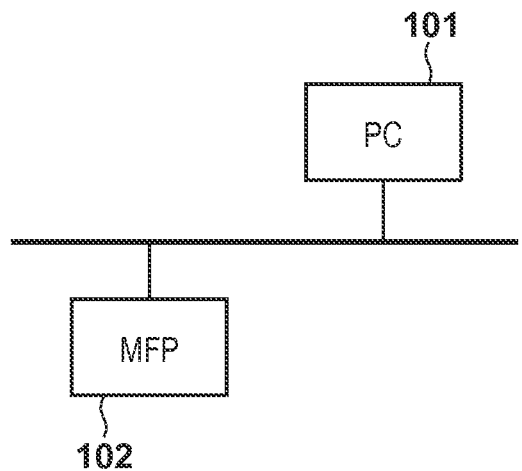
FIG. 1 is a diagram illustrating a printing system according to an embodiment of the present invention.

FIG. 1 is a diagram illustrating a printing system according to an embodiment of the present invention.

A PC 101 such as a host computer generates document data using an arbitrary application or the like, and generates print data using a printer driver or the like. A multi-function peripheral (MFP) 102 has a copy function, a scan function, a printing function, a box function, a facsimile function, and the like. This MFP 102 can serve as a PC printer that receives from the PC 101 a print job including print data that is described in, for example, a page description language, converts the received print job to image data, and prints the image data.

Figure 2:
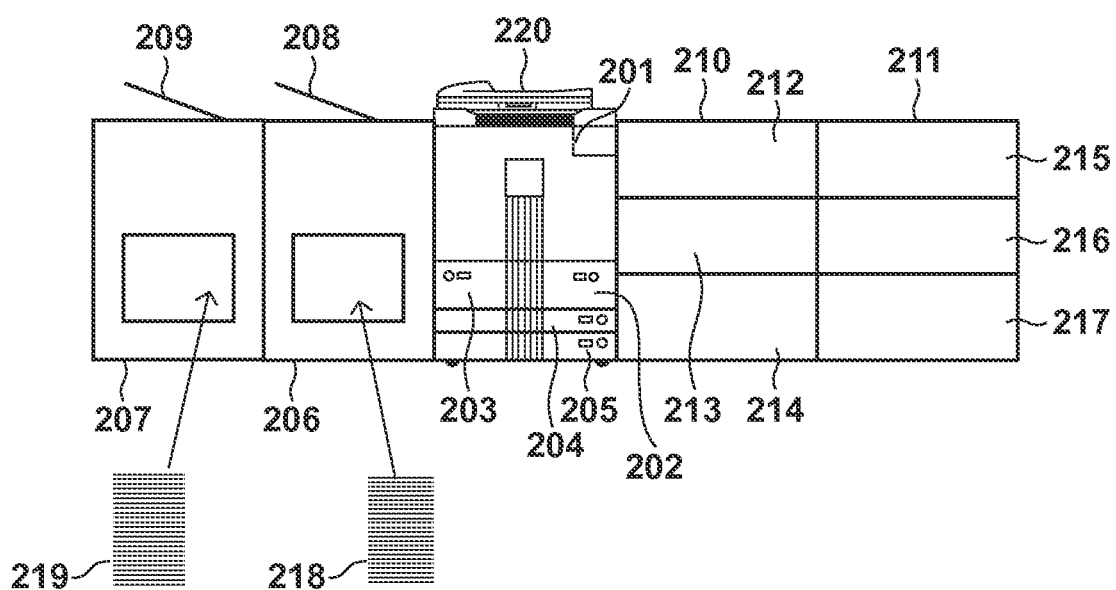
FIG. 2 is a diagram illustrating a configuration of an MFP according to the embodiment.

FIG. 2 is a diagram illustrating a configuration of the MFP 102 according so the embodiment.

Reference numerals 202 to 205 denote paper feed decks 1 to 4 that are provided in a main body 201 of the MFP 102, and a plurality of sheets to be subjected to printing by the MFP 102 can be set therein. Reference numerals 206 and 207 respectively denote discharge stackers 1 and 2 that are provided in the main body 201 of the MFP 102, and the discharge stackers 1 and 2 are able to receive and accommodate a large number of sheets that were subjected to printing by the MFP 102 and discharged. Reference numerals 208 and 209 denote sample trays 1 and 2, which can accommodate the printed sheets, of the discharge stackers 206 and 207, respectively.

Reference numerals 210 and 211 denote paper decks that are coupled to the main body 201 of the MFP 102 and configured to supply sheets that are to be subjected to printing by the MFP 102. Reference numerals 212 to 214 respectively denote paper feed decks 5 to 7 that are provided in the paper deck 210 and accommodate sheets to be subjected to printing by the MFP 102. Reference numerals 215 to 217 respectively denote paper feed decks 8 to 10 that are provided in the paper deck 211 and accommodate sheets to be subjected to printing by the MFP 102.

Also, reference numeral 218 denotes a bundle of sheets that was fed into de discharge stacker 206 and accommodated therein, and reference numeral 219 denotes a bundle of sheets that was fed into the discharge stacker 207 and accommodated therein. Further, reference numeral 220 denotes an automatic document feeding and reading unit for reading a document.

FIG. 3A is a functional block diagram illustrating a functional configuration of the printing system according to the embodiment.

The PC 101 includes document data 302, a printer driver 303, and a storage unit 304 in which an application for generating the document data 302 and the like are stored. The document data in this context is data generated by a document creation application installed in the PC 101. The printer driver 303 generates page description language (PDL) data based on the document data 302. PDL in this context refers to a page description language such as, for example, PostScript (PS), Printer Command Language (PCL), or LBP image Processing System (LIPS). A communication interface unit 305 controls an interface between the PC 101 and a network so as to transmit PDL data generated by the printer driver 303 to the network and receive data from the network.

Next, the functional, configuration of the MFP 102 will be described.

A communication interface 307 controls an interface between the MFP 102 and the network, and receives a print job (PDL data) and the like that are transmitted from a host computer 301. A data receiver 308 stores the PDL data received via the communication interface 307. An interpreter unit 309 interprets the PDL data received by the data receiver 308. Note that the interpreter unit 309 can interpret PDL data such as the above-described PS, PCL, or LIPS. Of course, PDL data may be in other formats. Data that is obtained by the interpreter unit 309 interpreting PDL data is intermediate data 310. A rendering unit 311 interprets the intermediate data 310 and converts it into image data. An image data storage 312 stores the image data generated by the rendering unit 311. A printer engine 313 receives the image data stored in the image data storage 312, and performs printing based on the image data.

A scanner unit 314 reads a document, and generates image data that corresponds to an image of the document. Note that image data that is obtained by the scanner unit 314 is stored as image data in the image data storage 312.

A storage unit 315 stores the image data in a nonvolatile manner. A control unit 316 includes a CPU 330 (FIG. 3B) and a memory or the like that has stored therein programs for performing various types of processing according to the embodiment, and controls operation of the MFP 102. A UI screen 317 includes a console unit that has keys, a touch panel, and the like that are operated by a user, and serves as a UI screen for causing the user to operate the MFP 102.

Figure 3B:
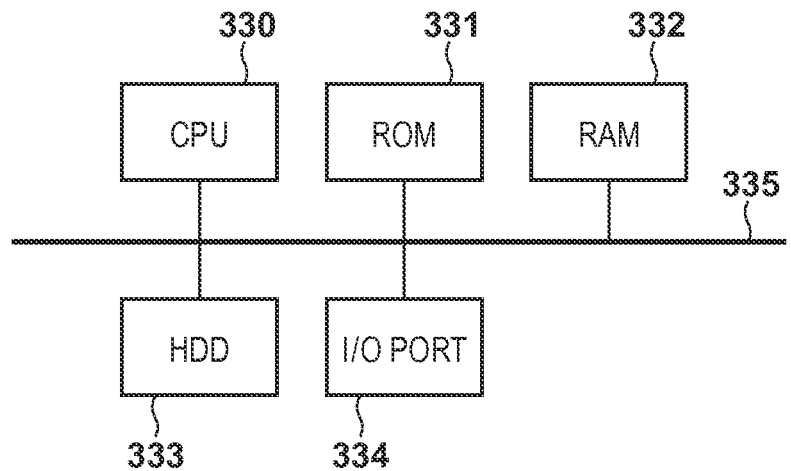
FIG. 3B is a block diagram illustrating a configuration of a control unit.

FIG. 3B is a block diagram illustrating a configuration of the control unit 316.

The CPU 330 executes a program stored in a ROM 331, and controls overall operation of the MFP 102. A RAM 332 provides a work area for storing various types of data when the control processing is performed by the CPU 330, and is used for temporarily storing image data and the like. A hard disk drive (HDD) 333 is a large-capacity nonvolatile storage device for storing image data and the like. An I/O port 334 connects the control unit 316 to a peripheral circuit, the scanner unit 314, and the printer engine 313. These constituent components are connected to each other via a bus 335 that transmits data and control signals.

Here, the interpreter unit 309, the rendering unit 311, and the like of FIG. 3A may be realized by the CPU 330 executing the program or by a dedicated circuit. Also, the image data storage 312 is realized by the RAM 332, and the storage unit 315 is realized by the HDD 333.

Figure 4:
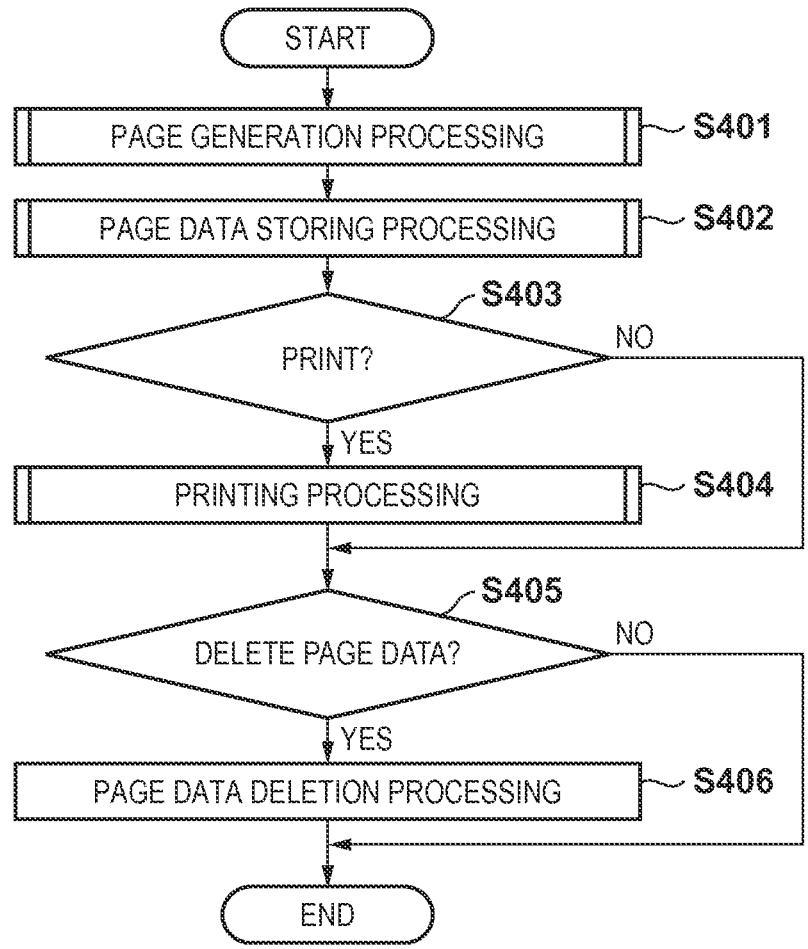
FIG. 4 is a flowchart for describing processing performed by the MFP according to the embodiment.

FIG. 4 is a flowchart for describing processing performed by the MFP 102 according to the embodiment. The program that executes this processing is stored in the ROM 331 of the control unit 316, and the processing is realized by the CPU 330 executing this program.

This processing starts in response to receiving a print job from the PC 101. First, in step S401, the CPU 330 executes page generation processing based on the received print job (PDL data). With this processing, the CPU 330 generates image data for P page or pages. Here, P is an integer that satisfies "P≧1". Note that the page generation processing will be described in detail later with reference to a flowchart of FIG. 11.

Next, the processing advances to step S402, and the CPU 330 executes processing for storing the page data generated in step S401. With this processing, the CPU 330 stores image data for P page or pages into the storage unit 315. Note that this page data storage processing will be described in detail later with reference to a flowchart of FIG. 12.

Next, the processing advances to step S403, and the CPU 330 determines whether or not to print the page data stored in step S402. Note that this determination of whether to perform printing or not depends on the setting of the UI screen 317. Here, if it is determined to perform printing, that is, if a print command has been input, the processing advances to printing processing in step S404. On the other hand, if no print command has been received by the UI screen 317, the processing advances to step S405. In step S404, the CPU 330 executes the printing processing. In the processing, the page data stored in step S402 is output to the printer engine 313, a sheet is fed from a designated paper feed source, and printing is performed thereon. Note that the printing processing will be described in detail later with reference to a flowchart of FIG. 15.

Accordingly, when the printing processing is completed, the processing advances to step S405, and the CPU 330 determines whether or not to delete the page data stored in step S402. The determination of whether to delete or not depends on an instruction from the UI screen 317. Here, if the CPU 330 has received a delete command from the UI screen 317, the processing advances to step S406 to delete the page data stored in step S402 from the storage unit 315. On the other hand, if the CPU 330 has not received the delete command from the UI screen 317, the processing ends without deleting the page data.

Hereinafter, description will be given on papers that are set in the paper feed decks 1 to 10, and settings of papers in the paper feed decks, before giving a detailed description of the present embodiment.

In the MFP 102 according to the embodiment, it is assumed that an operator sets papers in advance in the paper feed decks 1 to 10 as illustrated in FIG. 5.

FIG. 5 is a diagram illustrating paper information that is set for the paper feed decks 1 to 10 of the MFP 102 according to the embodiment. Note that the paper information is stored in a nonvolatile manner in the storage unit 315, which also serves as a paper information storage unit. Reference numerals 202-205 and 212-217 denote the paper feed decks (FIG. 2) corresponding to the paper feed decks 1 to 10.

Next, description will be given on how to set paper in the paper feed decks of the MFP 102.

Figure 6:
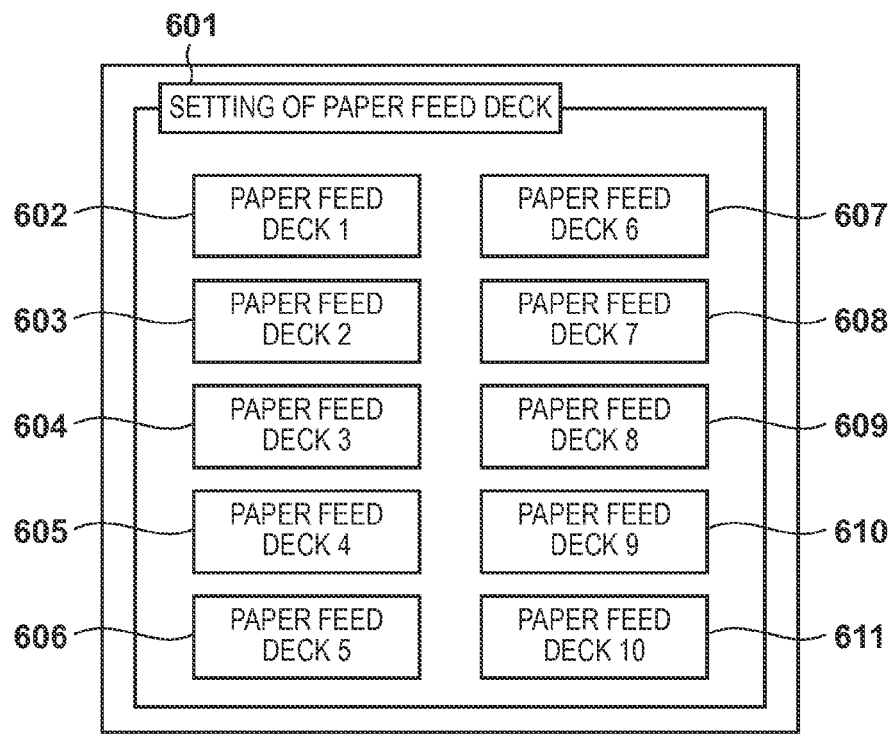
FIG. 6 is a diagram illustrating an example of a paper feed deck setting screen that is to be displayed on a UI screen of the MFP according to the embodiment.

FIG. 6 is a diagram illustrating an example of a paper feed deck setting screen displayed on the UI screen 317 of the MFP 102 according to the embodiment.

Reference numeral 601 denotes a tab indicating that the UI screen 317 is displaying the "paper feed deck setting" screen. Reference numerals 602 to 611 respectively denote selection buttons for setting paper in the respective paper feed decks 1 to 10.

Figure 7:
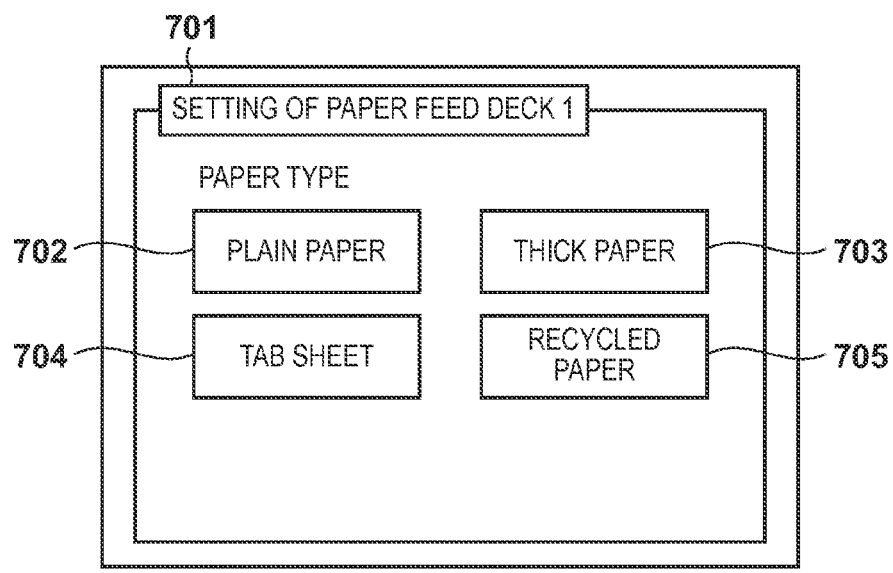
FIG. 7 is a diagram illustrating an example of a setting screen of a paper feed deck 1 when a selection button 602 on the paper feed deck setting screen of FIG. 6 is pressed.

FIG. 7 is a diagram illustrating an example of a setting screen of the paper feed deck 1 that is obtained when a selection button 602 for selecting the paper feed deck 1 on the paper feed deck setting screen of FIG. 6 is pressed.

Reference numeral 701 is a tab indicating that the UI screen 317 is displaying a setting screen of the paper feed deck 1. It is here possible to set a type of paper, that is, to set, by pressing any of buttons 702 to 705, any of "plain paper", "thick paper", "tab sheet", and "recycled paper" that correspond to the pressed button.

By this configuration, a user of the MFP 102 can set a desired type and size of paper for each paper feed deck. Note that, although a screen for setting the size of paper is omitted, a similar setting screen to that for setting the type of paper of FIG. 7 can be used for setting the size of paper.

Figure 8:
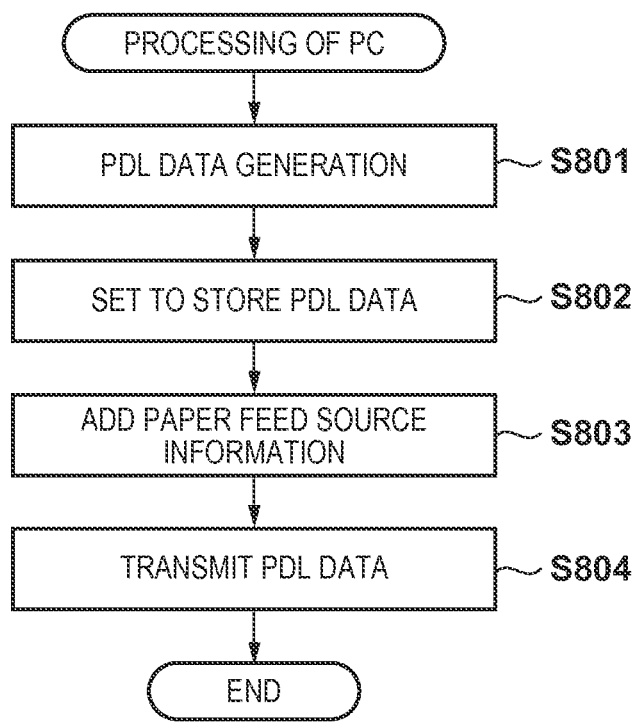
FIG. 8 is a flowchart for describing processing according to the embodiment in which a PC generates PDL data and transmits the generated PDL data to the MFP.

FIG. 8 is a flowchart for describing processing according to the embodiment in which the PC 101 generates PDL data and transmits a print job to the MFP 102. This processing is executed by the printer driver 303 provided in the PC 101. This printer driver 303 configures settings for storing PDL data in the storage unit 315 of the MFP 102, and settings of a paper feed source for use when performing printing by the MFP 306.

The description will be given on various types of settings on which the processing in the PC 101 is premised, before giving a description on a flowchart of FIG. 8.

Figure 9:
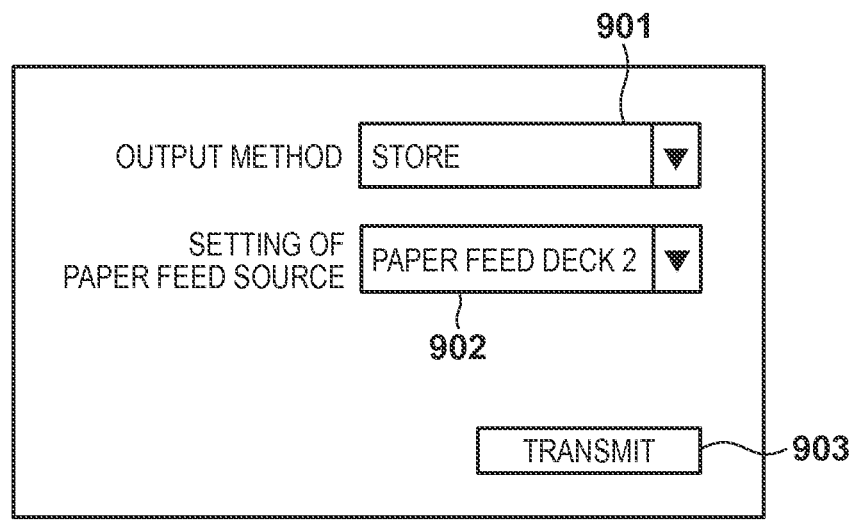
FIG. 9 is a diagram illustrating an example of an output setting screen that is displayed by a printer driver of the PC.

FIG. 9 is a diagram illustrating an example of an output setting screen that is displayed by a printer driver 303 of the PC 101.

Reference numeral 901 denotes options that are to be selected for an "output method" for a print job. Although some types of options are provided, it is assumed in the present embodiment that "print" and "store" are provided. "Print" is to instruct the MFP 102 to immediately perform printing based on the print job transmitted to the MFP 102. "Store" is to instruct to store, in the storage unit 315 of the MFP 102, the transmitted print job or image data that is obtained by deploying the print job, instead of immediately performing printing based on the print job by the MFP 102. In the example of settings in FIG. 9, it is set that a print job (or image data) is stored in the storage unit 315 of the MFP 102, and when a user of the MFP 102 gives an instruction to print the print job or the image data, the print job or the image data is printed on a sheet fed from the paper feed deck 2, because "the paper feed deck 2" is designated in 902 of FIG. 9.

Reference numeral 902 denotes options to be designated for a paper feed deck that serves as a paper feed source. The options include, all the paper feed decks 1 to 10 provided in the MFP 102, or "AUTO". "AUTO" is a setting in which the MFP 102 automatically selects a paper feed deck that accommodates paper whose type and size match with the paper type and paper size that are instructed by the print job, and printing is performed on a sheet fed from the selected paper feed deck. When a "transmission" button 903 is pressed, PDL data generated by the printer driver 303 is transmitted to the MFP 102.

Figure 10:
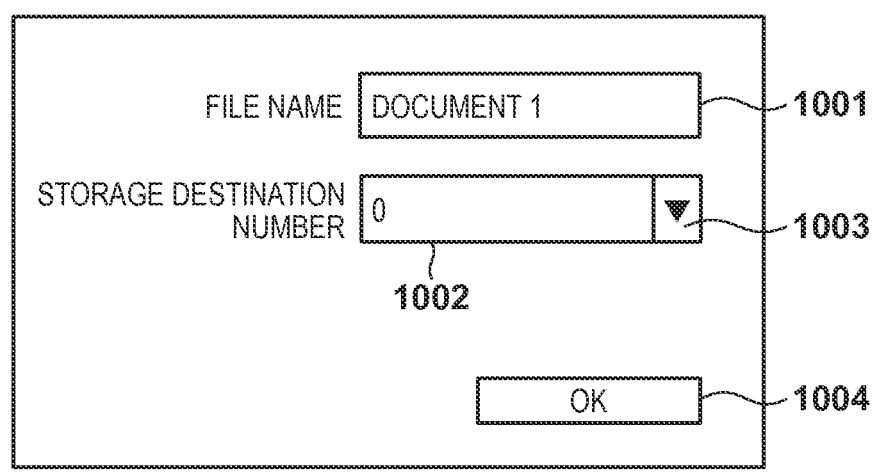
FIG. 10 is a diagram illustrating an example of a storage setting screen that is displayed by the printer driver of the PC.

FIG. 10 is a diagram illustrating an example of a storage setting screen that is displayed by the printer driver 303 of the PC 101. This screen is displayed by "store" being selected as "the output method" 901 in FIG. 9.

Reference numeral 1001 denotes an edit box into which a name of a file to be stored is to be input. The input into the edit box 1001 can be performed using the PC 101, and defines the name of a print job or image data to be stored in the MFP 102. Reference numeral 1002 denotes options to be selected for a "storage destination number" (box number) that indicates a location of the MFP 102 where a print job or image data is stored. In this embodiment, it is assumed that "0 to 99" are provided as the options. Note that the storage destination number can be selected among "0 to 99" by performing scrolling using a scroll bar 1003. An OK button 1004 is a button for confirming the setting of this storage destination.

Returning to the flowchart of FIG. 8, the processing performed by the printer driver 303 of the PC 101 will be described.

First, in step S801, the printer driver 303 converts the document data 302 generated by an application into PDL data. Note that the PDL data indicates a page description language such as PS, PCL, or LIPS. Next, the processing advances to step S802, the printer driver 303 receives a setting whether to print the PDL data generated in step S801 by the MFP 102 or to store the PDL data in the MFP 102. In this embodiment, it is assumed as illustrated in FIG. 9 that "store" is selected. Further, it is assumed from the screen of FIG. 10 that the "file name" of a file to be stored in the MFP 102 is "document 1", and the storage destination number of the file is set to "0".

Next, the processing advances to step S803, and the printer driver 303 adds paper feed source information to the PDL data generated in step S801. This paper feed source information sets a paper feed deck from which a sheet is fed when printing the print data. In the paper feed source setting 902 of the setting screen of the printer driver in FIG. 9, a "paper feed deck 2" is set. Also, an option for the paper feed source setting 902 may be set to "AUTO". If the "AUTO" has been set, the CPU 330 of the MFP 102 will select the paper feed deck in which paper is set whose size matches with the paper size added to the print job, when executing the print job. Next, the processing advances to step S804, and the printer driver 303 transmits the print job including PDL data and the like to the MFP 102 via the communication interface unit 305.

Next, the page generation processing in step S401 of FIG. 4 will be described with reference to FIG. 11.

FIG. 11 is a flowchart for describing the page generation processing in step S401 of FIG. 4. Here, the description will be made taking, as an example, the case where processing of the interpreter unit 309 and the rendering unit 311 is executed by the CPU 330 executing the program. However, as described above, the processing may be executed by dedicated hardware.

First, in step S1101, the CPU 330 receives the print job transmitted by the printer driver 303. Next, the processing advances to step S1102, and the CPU 330 (the interpreter unit 309) interprets the print job received in step S1101. Next, the processing advances to step S1103, and the CPU 330 converts the PDL data interpreted by the interpreter unit 309 into intermediate data. This intermediate data refers to a collection of drawing objects, such as "bitmap", "run length", "trapezoid", "box", and "Fast Boundary coded bitmap", background patterns, and drawing logics of drawing them into a raster memory. Then, the processing advances to step S1104, and the CPU 330 subjects the generated intermediate data 310 to RIP. The RIP in this context refers to processing in which the rendering unit 311 deploys the intermediate data 310 into image data, and the image data is stored in the image data storage 312. Also, the CPU 330 substitutes the total number of pages for a variable P_MAX of the RAM 332 that indicates the total number of pages of the image data.

FIG. 12 is a flowchart for describing the page data storage processing in step S402 of FIG. 4 performed by the MFP 102.

First, in step S1201, the CPU 330 stores the image data stored in the image data storage 312 into the storage unit 315. Then, when a stored data button on the UI screen 317 is pressed, the CPU 330 displays a stored data screen that is illustrated in FIG. 13.

Figure 13:
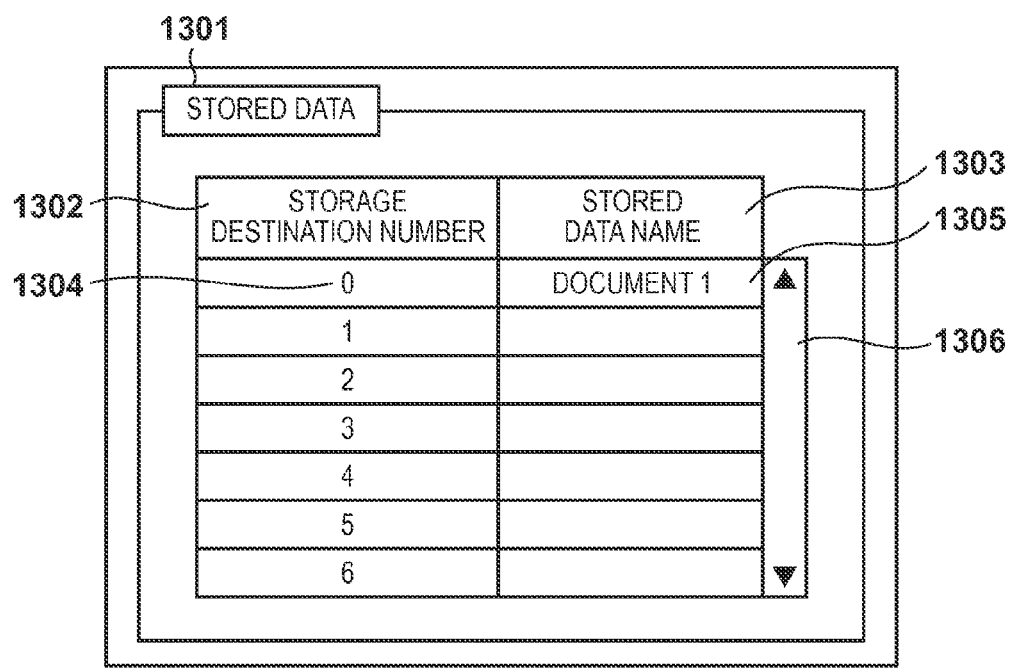
FIG. 13 is a diagram illustrating an example of a stored data screen according to the embodiment.

FIG. 13 is a diagram illustrating an example of the stored data screen according to the embodiment.

Reference numeral 1301 denotes a tab indicating that the "stored data" screen is being displayed. Reference numeral 1302 denotes an item name that indicates a "storage destination number". Reference numeral 1303 denotes an item name that indicates a "stored data name". Reference numeral 1304 denotes that "storage destination number is 0" that was input on the storage setting screen of FIG. 10. Note that in the embodiment, the storage destination number ranges from 0 to 99 as described with reference to FIG. 10. Reference numeral 1305 denotes a file name of stored data, and indicates "document 1". This is the character string that was input on the storage setting screen of FIG. 10. Note that blanks denote that no stored data is registered. Reference numeral 1306 is what is scrolled in order to display a storage destination number that is not displayed on the screen.

Next, the processing advances to step S1202, and the CPU 330 reads out the "paper feed source information" added to the image data. Note that in the present embodiment, it is assumed that information as shown in FIG. 14A is registered as the paper feed source information.

FIG. 14A illustrates the state in which the "storage destination number" of this image data is "0", and the size of paper to be used for printing the image data is "A4", and the paper feed source that feeds the paper is set to the "paper feed deck 1". Reference numeral 1401 denotes the type of paper to be used for printing the image data and here indicates "not-specified". Also, reference numeral 1402 denotes a paper feeding method for use in printing of the image data and here indicates "not-specified".

Next, the processing advances to step S1203, and the CPU 330 determines whether or not the "paper feed source setting" read out in step S1202 is "AUTO". If it is determined by the CPU 330 that the paper feed source setting is "AUTO", the processing advances to step S1204, and if otherwise determined, the processing advances to step S1205. In step S1204, since the "paper feed source setting" is "AUTO", the CPU 330 determines which paper feed deck of the MFP 102 is to feed a sheet. First, the CPU 330 searches for the paper feed decks set in the MFP 102. In this embodiment, it is assumed that the above-described settings as shown in FIG. 5 are registered in each paper feed deck. Next, the CPU 330 reads out the paper size from the image data stored in the storage unit 315. In this embodiment, it is assumed that information as shown in FIG. 14C is added to the image data.

In FIG. 14C, the "storage destination number" of the image data is "0", and the size of paper to be used for printing this image data is "A4", and the paper feed source that feeds the paper is set to "AUTO". Also, the type 1401 of paper to be used for printing this image data is set to "Any" (any type is OK), and the method 1402 for feeding the paper to be used for printing this image data is set to "not-specified".

Therefore, the CPU 330 obtains "A4" as the size of paper to be used for printing the image data. Also, the CPU 330 determines whether or not there is a paper feed deck for which the paper size "A4" is set among the paper feed decks 1 to 10 of the MFP 102. Here, referring to FIG. 5, the "paper feed deck 2", the "paper feed deck 4", the "paper feed deck 6", the "paper feed deck 8", or the "paper feed deck 10" are paper feed decks for which the paper size "A4" is set. Also, it is assumed that the preference order of the paper feed decks is determined in advance, that is, the preference order of "paper feed deck 2", the "paper feed deck 4", the "paper feed deck 6", the "paper feed deck 8", and the "paper feed deck 10" is set. Note that this preference order is determined in advance for each apparatus.

Therefore, in the present embodiment, the CPU 330 selects the "paper feed deck 2" as the paper feed source. Then, the CPU 330 rewrites the paper feed source of FIG. 14C from "AUTO" to "paper feed deck 2".

Next, the processing advances to step S1205, and the CPU 330 obtains "paper type" information that is set for the "paper feed deck 2". In the embodiment, since, as shown in FIG. 5, "plain paper" of A4 size is set in the "paper feed deck 2", the paper type 1401 is set so "plain paper". Then, the processing advances to step S1206, and the CPU 330 adds the paper type information thus generated to the image data stored in the storage unit 315.

By this processing, in the present embodiment, it is assumed that the paper feed source information shown in FIG. 14B, in which the paper feed source of FIG. 14C is changed from "AUTO" to "paper feed deck 2" and the paper type 1401 of FIG. 14C is changed from "Any" to "plain paper", is added to the image data.

Next, the printing processing performed by the MFP 102 according to the embodiment will be described with reference to a flowchart of FIG. 15.

Figure 15:
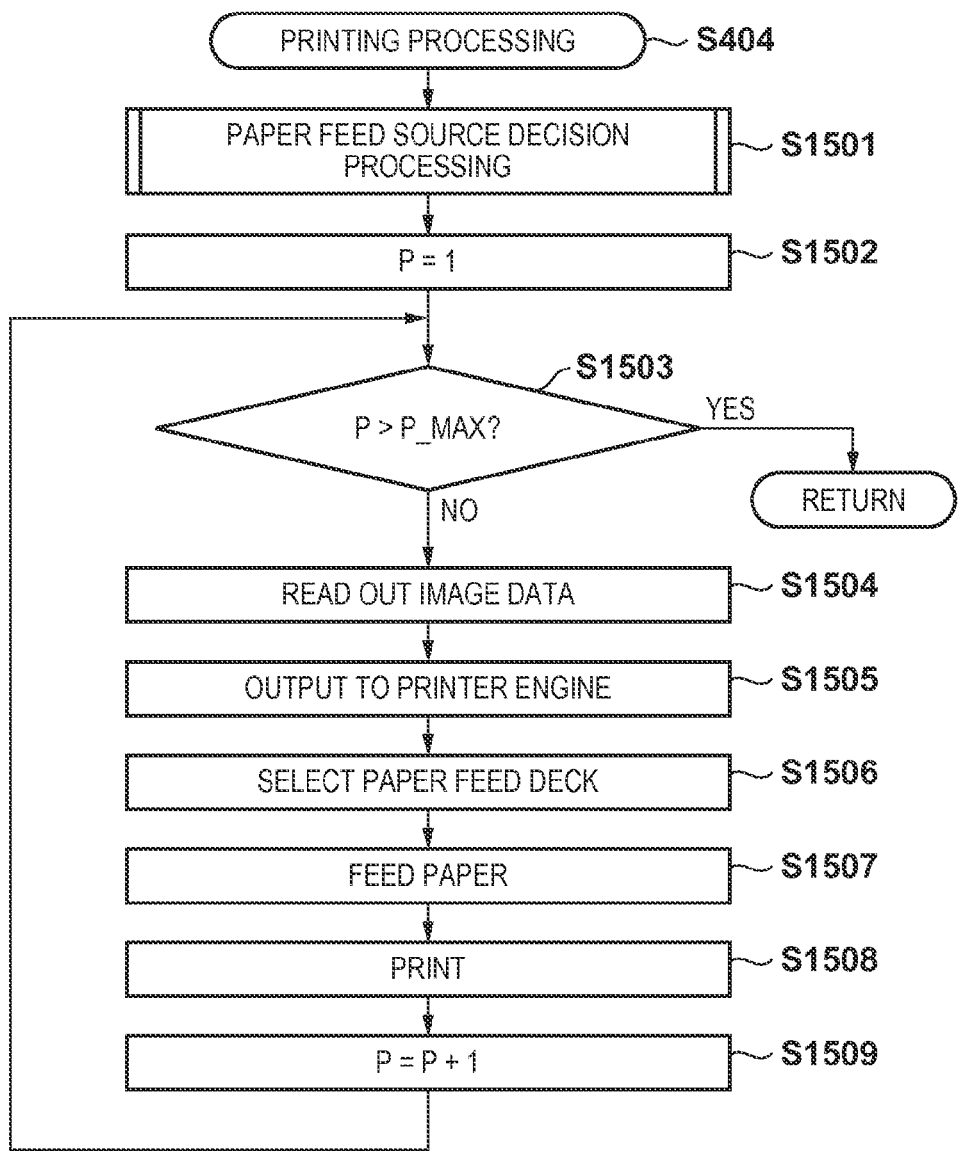
FIG. 15 is a flowchart for describing printing processing in step S404 of FIG. 4 performed by the MFP according to the embodiment.

FIG. 15 is a flowchart for describing the printing processing in step S404 of FIG. 4 performed by the MFP 102 according to the embodiment. A program that executes this processing is stored in the ROM 331 of the control unit 316, and the processing is realized by the CPU 330 executing this program.

First, in step S1501, the CPU 330 executes paper feed source decision processing. Here, the CPU 330 determines whether or not the paper feed source information that is set for the image data stored in the storage unit 315 matches with the paper feed deck information that is set for the MFP 102 (FIG. 5), and decides a paper feed source. This is performed because time has elapsed since the image data was stored in the storage unit 315, and the state of the paper feed deck information of the MFP 102 may have been changed. Note that the paper feed source decision processing will be described in detail later with reference to a flowchart of FIG. 16.

Next, the processing advances to step S1502, and the CPU 330 initializes a parameter P that indicates the page number to "1". Next, the processing advances to step S1503, and the CPU 330 determines whether or not the parameter P (provided in the RAM 332) exceeds the variable P_MAX that indicates the total number of pages. Here, if the parameter P does not exceed P_MAX, the CPU 330 determines that there is still at least one page to be processed and the processing advances to step S1504, but if otherwise, the processing ends.

In step S1504, the CPU 330 reads out, from the storage unit 315, image data of page P that is currently processed, and writes the image data into the image data storage 312. At this time, if the PDL data is stored in the storage unit 315, the CPU 330 coverts the PDL data of page P into image data to store it in the image data storage 312. Then, the processing advances to step S1505, and the CPU 330 transfers the image data stored in the image data storage 312 to the printer engine 313. Next, the processing advances to step S1506, and the CPU 330 decides which paper feed deck is to feed paper in order for the transferred image data to be printed on a desired sheet. In this case, the paper feed deck that is to feed paper is selected based on the determination result of step S1501. Then, the processing advances to step S1507, and the CPU 330 causes the paper feed deck selected in step S1506 to feed a paper. Then, the processing advances to step S1508, and the CPU 330 causes the printer engine 313 to perform printing on the paper fed from the paper feed deck. Then, in step S1509, the CPU 330 increments the parameter P by 1 and counts up the number of processed pages, and the processing advances to step S1503.

Next, the processing for deciding a paper feed source performed in step S1501 of FIG. 15 will be described with reference to FIG. 16.

Figure 16:
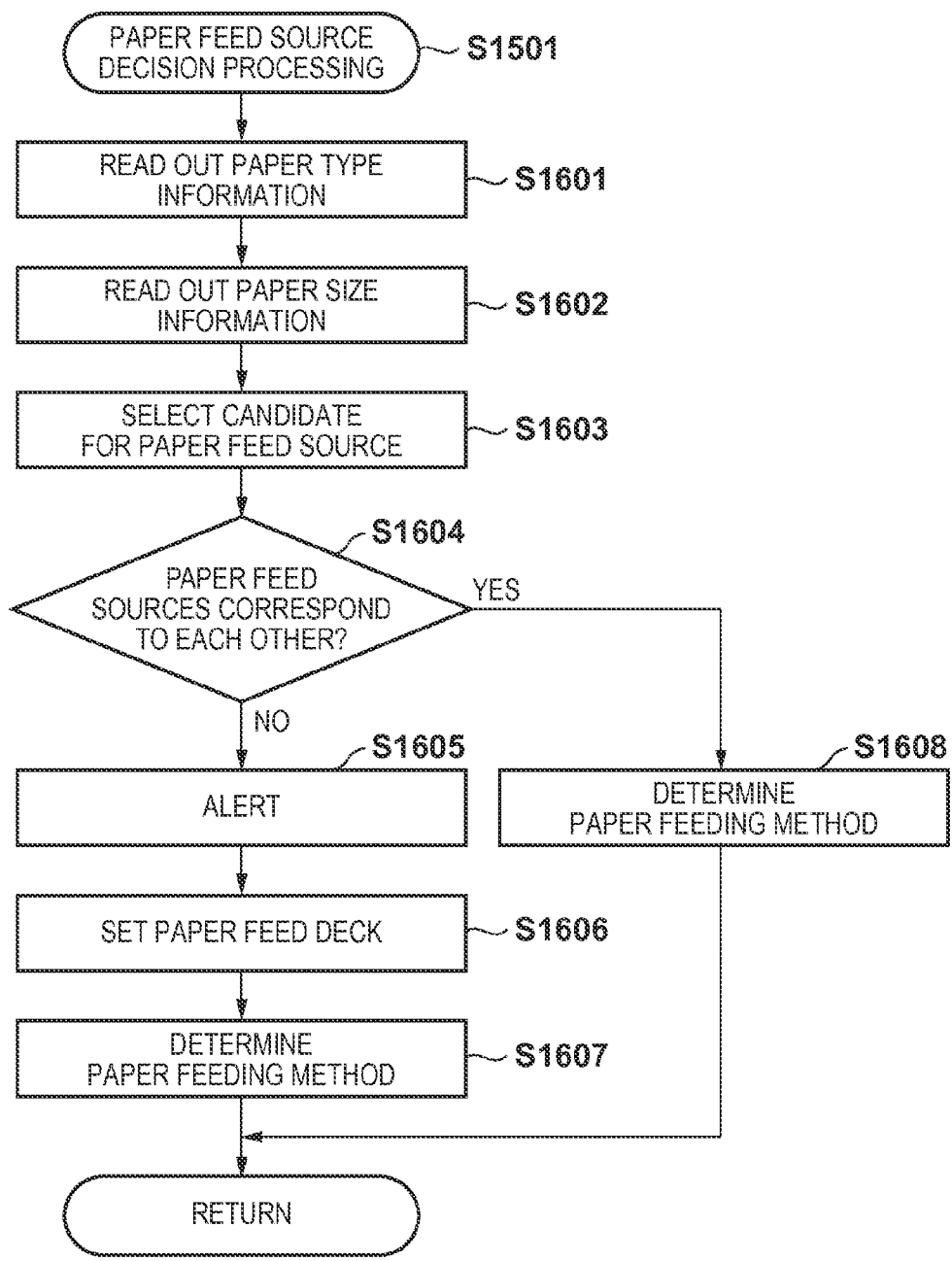
FIG. 16 is a flowchart for describing processing for deciding a paper feed source in step S1501 of FIG. 15 performed by the MFP according to the embodiment.
Figures 17, 18:
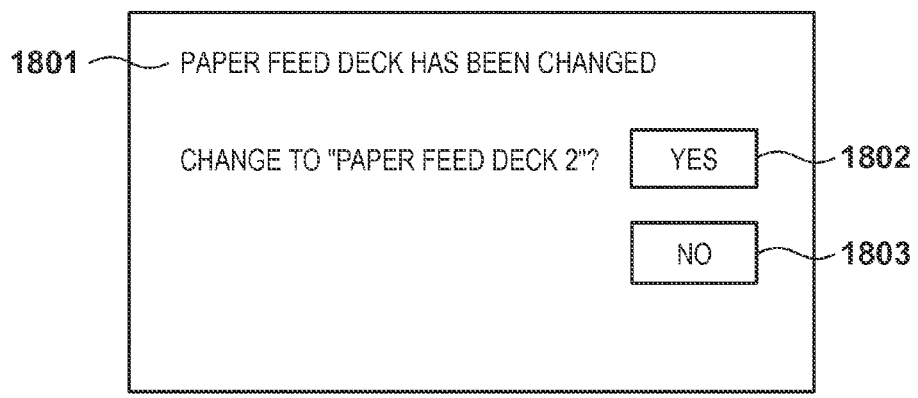
FIG. 17 is a diagram illustrating a state in which paper information that is set for the paper feed decks 1 to 10 of the MFP according to the embodiment is changed.
FIG. 18 is a diagram illustrating an example of display of an alert screen that is displayed on the MFP according to the embodiment.

FIG. 16 is a flowchart for describing the paper feed source decision processing in step S1501 of FIG. 15 that is performed by the MFP 102 according to the embodiment. Note that it is assumed that information of papers stored in the paper feed decks provided in the MFP 102 at the time of starting this processing is set as shown in FIG. 17. In other words, the states of settings of the paper feed decks when the image data is stored in the storage unit 315 in step S402 of FIG. 4 are changed from FIG. 5 to FIG. 17.

First, in step S1601, the CPU 330 reads out the paper type 1401 from the information (FIG. 14B) added to the image data stored in the storage unit 315. Here, the paper type 1401 is "plain paper". Next, the processing advances to step S1602, and the CPU 330 reads out the paper size information from the information (FIG. 14B) added to the image data stored in the storage unit 315. Here, the paper size is "A4". Then, the processing advances to step S1603, and the CPU 330 selects a paper feed deck in which paper whose paper type and paper size correspond to the paper information is set, among all the paper feed decks provided in the MFP 102. That is, a paper feed deck in which "plain paper" of "A4" is set is selected. In this case, in FIG. 17, there are a plurality of paper feed decks in which "plain paper" of "A4" is set. Accordingly, the CPU 330 selects a paper feed deck according to a predetermined preference order. In this embodiment, the "paper feed deck 6" is deemed to be appropriate, and the "paper feed deck 6" serves as a candidate for the paper feed source.

Next, the processing advances to step S1604, and the CPU 330 reads out the paper feed source information from the information (FIG. 14B) added to the image data stored in the storage unit 315. Then, the CPU 330 determines whether or not this read-out paper feed source information (here, "paper feed deck 2") corresponds to the paper feed source candidate determined in step S1603. This is performed because the printing termination time may be varied depending on locations of the paper feed decks. Here, if the read-out paper feed source information corresponds to the paper feed source candidate, the processing advances to step S1608, but otherwise, the processing advances to step S1605.

In step S1605, the CPU 330 displays an alert screen illustrated, for example, in FIG. 18 on the UI screen 317.

This alert screen displays a message 1801 indicating that a paper feed source information (paper feed deck 2) added to the image data differs from a current candidate (paper feed deck 6) for a paper feed source. If the user wants a sheet fed from the original paper feed source to be subjected to printing, "Yes" 1802 is selected. On the other hand, if the user does not want to change the paper feed source, "No" 1803 is selected.

Then, the processing advances to step S1606, and the CPU 330 receives a result of the change of the paper feed deck information made by the user using the UI screen of FIGS. 6 and 7. In this case, if the user selects "Yes" 1802 in FIG. 18, then the user must store plain papers of A4 size into the paper feed deck 2 and then change paper feed deck information of the paper feed deck 2. The detail thereof is included in the description that has already been given, and is thus omitted.

Then, the processing advances to step S1607, and the CPU 330 writes "place priority on paper feed source" into the paper feeding method 1402 (FIG. 14B) added to the image data stored in the storage unit 315. The information to be added to the image data results in information shown in FIG. 14D. Therefore, in this case, since the processing is performed, placing priority on the paper feed source, "paper feed deck 2" that is the paper feed source set in the stored image data feeds a sheet and printing is performed on the sheet.

On the other hand, if it is determined in step S1604 that the read-out paper feed source information corresponds to the paper feed source candidate, the processing advances to step S1608, and the CPU 330 writes "place priority on paper type" into the information 1402 (FIG. 14B) added to the image data stored in the storage unit 315. The information to be added to the image data results in information shown in FIG. 14E. Therefore, when a paper feed deck is selected with the stored image data, the paper feed deck is searched with the "paper type", and the corresponding paper feed deck is decided based on the paper type.

The above-described embodiment has described the print data included in the print job, taking PDL data as an example, but the print data may be image data obtained by scanning of the scanner unit 314, that is, data of a copy job.

Also, the above-described embodiment has been described, taking as an example the case where PDL data is converted into image data and then stored in the MFP 102, but a configuration is also possible in which PDL data is stored as a print job before being converted into image data.

According to the present embodiment, as described above, at the time of storing a print job in a printing apparatus, if a specific sheet feeding unit was set as a paper feed source for the print job, paper type information set for the specific sheet feeding unit is read out. Then, the paper type information is added to settings of the print job and stored. Accordingly, even in the case of performing printing of the print job, for example, a few days later, it is possible to perform printing always on the same type of paper (sheet) since a sheet feeding unit is selected according to this paper type information.

Also, at the time of storing a print job in a printing apparatus, if the paper feed source for a print job was set to "AUTO", paper type information of the sheet feeding unit that accommodates paper whose paper size corresponds to that of the print job is read out. Then, the paper type information is added to settings of the print job and stored. Accordingly, even in the case of performing printing of the print job, for example, a few days later, it is possible to perform printing always on the same type of paper (sheet) since a sheet feeding unit is selected according to the paper type information.

Also, at the time of storing a print job in a printing apparatus, if a specific sheet feeding unit was set as a paper feed source for the print job, paper type information set for the specific sheet feeding unit is read out. Then, the paper type information is added to settings of the print job and stored. Furthermore, an alert display is given if, at the time of performing printing of the print job, the sheet feeding unit that accommodates paper whose paper type corresponds to the stored paper type differs from the specific sheet feeding unit that was set for the print job. Accordingly, if it is preferable to cause the specific sheet feeding unit to feed a paper, the user can be prompted to set desired paper in this specific sheet feeding unit. Accordingly, it is possible to perform printing always on a paper (sheet) fed from the specific sheet feeding unit, and prevent a reduction in productivity due to a change in the sheet feeding unit, and the like.

The following configuration is also conceivable as a modification of the present embodiment. That is, at the time of storing a print job in a printing apparatus, if a specific sheet feeding unit was set as a paper feed source for the print job, paper type information set for the specific sheet feeding unit is read out. Then, the paper type information is added to settings of the print job and stored. Moreover, at the time of performing printing of the print job, the paper type added to the stored print job is compared with the information on the type of paper accommodated in the sheet feeding unit that is set for the print job. If the paper type and the paper type information do not correspond to each other, the user will be alerted. This alert is displayed on the UI screen 317 together with a message indicating that paper information that is set for the sheet feeding unit has been changed during a time period from input to printing of the print job. Displaying such alert can prevent the print job from being printed on an unexpected type of paper when the stored print job is printed, for example, in a few days later from having been stored, and the paper information that is set for the sheet feeding unit has been changed since the print job was input.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such changes and equivalent structures and functions.

This application claims the benefit of Japanese Patent Application No. 2012-234959, filed Oct. 24, 2012, which is hereby incorporated by reference herein in its entirety.

What is claimed is:

1. A printing apparatus comprising:
    a plurality of sheet feeding units; and
    a computer comprising:
        a setting unit configured to set paper type information for each of the plurality of sheet feeding units;
        a storage unit configured to store a print job transmitted from an external apparatus, the print job including designation of one of the plurality of sheet feeding units as a paper feed source;
        an instruction unit configured to receive, from a user, an instruction to start an execution of the print job stored in the storage unit after the storage unit stores the print job;
        a first obtaining unit configured to obtain first paper type information that was set, when the print job was stored in the storage unit, for a sheet feeding unit designated by the print job instructed to start the execution by the instruction unit;
        a second obtaining unit configured to obtain second paper type information set for the sheet feeding unit designated by the print job instructed to execute by the instruction unit when the instruction is received; and
        an alert unit configured to alert the user that the paper type information for the sheet feeding unit designated by the print job has been changed after the print job is stored, if the first paper type information and the second paper type information do not match.

2. The printing apparatus according to claim 1, wherein the alert unit is configured to alert the user by displaying a message indicating that the paper type information for the sheet feeding unit designated as the paper feed source has been changed after the print job is stored in the storage unit.

3. The printing apparatus according to claim 1, wherein the storage unit is configured to store image data obtained by deploying the print job.

4. The printing apparatus according to claim 1, wherein the computer further comprises a selection unit configured to select, in a case that there are a plurality of sheet feeding units that accommodate a sheet having the paper information stored in the storage unit, one sheet feeding unit in accordance with a predetermined preference order.

5. The printing apparatus according to claim 1, wherein the paper information includes information on a paper type and a paper size.

6. A method of controlling a printing apparatus having a plurality of sheet feeding units, the method comprising:
    setting paper type information for each of the plurality of sheet feeding units;
    storing, in a memory, a print job transmitted from an external apparatus, the print job including designation of one of the plurality of sheet feeding units as a paper feed source;

receiving, from a user, an instruction to start an execution of the print job stored in the memory after the print job is stored in the memory;

obtaining first paper type information that was set, when the print job was stored in the memory, for a sheet feeding unit designated by the print job instructed to start the execution by the instruction;

obtaining second paper type information set for the sheet feeding unit designated by the print job instructed to execute by the instruction when the instruction is received; and alerting the user that the paper type information for the sheet feeding unit designated by the print job has been changed after the print job is stored in the memory, if the first paper type information and the second paper type information do not match.

7. A non-transitory computer-readable storage medium storing a program for causing a computer to execute a method for controlling a printing apparatus having a plurality of sheet feeding units, the method comprising:

setting paper type information for each of the plurality of sheet feeding units;

storing, in a memory, a print job transmitted from an external apparatus, the print job including designation of one of the plurality of sheet feeding units as a paper feed source;

receiving, from a user, an instruction to start an execution of the print job stored in the memory after the print job is stored in the memory;

obtaining first paper type information that was set, when the print job was stored in the memory, for a sheet feeding unit designated by the print job instructed to start the execution by the instruction;

obtaining second paper type information set for the sheet feeding unit designated by the print job instructed to execute by the instruction when the instruction is received; and alerting the user that the paper type information for the sheet feeding unit designated by the print job has been changed after the print job is stored in the memory, if the first paper type information and the second paper type information do not match.

\* \* \* \* \*